(12) United States Patent
Yang et al.

(10) Patent No.: US 11,130,844 B2
(45) Date of Patent: Sep. 28, 2021

(54) POLYAMIDE-IMIDE PRECURSOR, POLYAMIDE-IMIDE FILM, AND DISPLAY DEVICE COMPRISING SAME

(71) Applicant: KOLON INDUSTRIES, INC., Gwacheon-si (KR)

(72) Inventors: Jong Won Yang, Yongin-si (KR); Hak Gee Jung, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 329 days.

(21) Appl. No.: 15/540,803

(22) PCT Filed: Dec. 31, 2015

(86) PCT No.: PCT/KR2015/014593
§ 371 (c)(1),
(2) Date: Jun. 29, 2017

(87) PCT Pub. No.: WO2016/108675
PCT Pub. Date: Jul. 7, 2016

(65) Prior Publication Data
US 2018/0002487 A1  Jan. 4, 2018

(30) Foreign Application Priority Data

Dec. 31, 2014 (KR) .................. 10-2014-0195670
Dec. 30, 2015 (KR) .................. 10-2015-0190313

(51) Int. Cl.
*C08G 73/14* (2006.01)
*C08J 5/18* (2006.01)
(Continued)

(52) U.S. Cl.
CPC ............. *C08G 73/14* (2013.01); *C08G 81/00* (2013.01); *C08J 5/18* (2013.01); *C08G 73/1028* (2013.01);
(Continued)

(58) Field of Classification Search
CPC .... C08G 73/14; C08G 81/00; C08G 73/1028; C08G 73/1039; C08G 73/1042; C08G 73/1067; C08J 5/18; C08J 2379/08
See application file for complete search history.

(56) References Cited

U.S. PATENT DOCUMENTS

2008/0044684 A1* 2/2008 Chan .................. B29B 17/0042
428/626
2012/0296050 A1* 11/2012 Cho ........................ C08L 79/08
525/436
(Continued)

FOREIGN PATENT DOCUMENTS

JP      200874991 A     4/2008
JP      2008074991 A *  4/2008
(Continued)

OTHER PUBLICATIONS

JP-2008074991-A Machine Translation (Year: 2008).*
(Continued)

*Primary Examiner* — Travis M Figg
(74) *Attorney, Agent, or Firm* — Sughrue Mion, PLLC (57) ABSTRACT

The present invention relates to a polyamide-imide precursor, a polyamide-imide obtained by imidizing the same, a polyamide-imide film, and an image display device including the film. The polyamide-imide precursor includes, in a molecular structure thereof, a first block, obtained by copolymerizing monomers including dianhydride and diamine, a second block, obtained by copolymerizing monomers including an aromatic dicarbonyl compound and the diamine, and a third block, obtained by copolymerizing monomers including the aromatic dicarbonyl compound and aromatic diamine. The dianhydride for forming the first block includes 2-bis(3,4-dicarboxyphenyl)hexafluoropropane dianhydride (6FDA), and the diamine for forming the
(Continued)

first block and the second block includes 9,9-bis(3-fluoro-4-aminophenyl)fluorene (FFDA).

14 Claims, 1 Drawing Sheet

(51) Int. Cl.
 *C08G 81/00* (2006.01)
 *C08G 73/10* (2006.01)

(52) U.S. Cl.
 CPC ..... *C08G 73/1039* (2013.01); *C08G 73/1042* (2013.01); *C08G 73/1067* (2013.01); *C08J 2379/08* (2013.01)

(56) References Cited

U.S. PATENT DOCUMENTS

| | | | | |
|---|---|---|---|---|
| 2014/0031499 A1* | 1/2014 | Cho | ......................... | C08K 3/36 525/431 |
| 2014/0072813 A1* | 3/2014 | Fujii | ....................... | B32B 17/10 428/435 |

FOREIGN PATENT DOCUMENTS

| | | |
|---|---|---|
| JP | 2014220348 A | 11/2014 |
| KR | 10-2013-0029129 A | 3/2013 |
| KR | 10-2013-0035691 A | 4/2013 |
| KR | 10-2013-0110589 A | 10/2013 |
| KR | 10-2014-0012270 A | 2/2014 |
| WO | 2014/003210 A1 | 1/2014 |

OTHER PUBLICATIONS

European Patent Office; Communication dated Apr. 25, 2018 in counterpart Application No. 15875769.0.
Japanese Patent Office; Communication dated May 22, 2018 in counterpart application No. 2017-534993.
Office Action issued in Taiwanese Patent Application No. 104144755, dated Jan. 13, 2016.
International Search Report of PCT/KR2015/014593, dated Mar. 29, 2016 [PCT 210].
Written Opinion of PCT/KR2015/014593, dated Mar. 29, 2016 [PCT 237].

* cited by examiner

POLYAMIDE-IMIDE PRECURSOR, POLYAMIDE-IMIDE FILM, AND DISPLAY DEVICE COMPRISING SAME

CROSS REFERENCE TO RELATED APPLICATIONS

This application is a National Stage of International Application No. PCT/KR2015/014593 filed Dec. 31, 2015, claiming priority based on Korean Patent Application No. 10-2014-0195670 filed Dec. 31, 2014 and 10-2015-0190313 filed Dec. 30, 2015, the contents of all of which are incorporated herein by reference in their entirety.

TECHNICAL FIELD

The present invention relates to a polyamide-imide precursor, a polyamide-imide film obtained by imidizing the polyamide-imide precursor, and a display device including the polyamide-imide film.

BACKGROUND ART

Generally, a polyimide (PI) film is obtained by shaping a polyimide resin into a film. The polyimide resin is a highly heat-resistant resin which is prepared by performing solution polymerization of aromatic dianhydride and aromatic diamine or aromatic diisocyanate to prepare a polyamic acid derivative and then performing imidization by ring-closing dehydration at a high temperature. Having excellent mechanical, heat resistance, and electrical insulation properties, the polyimide film is used in a wide range of electronic materials such as semiconductor insulating films, electrode-protective films of TFT-LCDs, and substrates for flexible printed wiring circuits.

Polyimide resins, however, are usually colored brown and yellow due to a high aromatic ring density, so that transmittance in a visible ray region is low and the resins exhibit a yellowish color. Accordingly, light transmittance is reduced and birefringence is high, which makes it difficult to use the polyimide resins as optical members.

In order to solve the above-described limitation, attempts have been made to perform polymerization using purification of monomers and solvents, but the improvement in transmittance was not significant. With respect thereto, in U.S. Pat. No. 5,053,480, the transparency and hue are improved when the resin is in a solution or in a film form using a method using an aliphatic cyclic dianhydride component instead of aromatic dianhydride. However, this was only an improvement of the purification method, and there remains a limitation in the ultimate increase in transmittance. Accordingly, high transmittance could not be achieved, but the thermal and mechanical deterioration resulted.

Further, U.S. Pat. Nos. 4,595,548, 4,603,061, 4,645,824, 4,895,972, 5,218,083, 5,093,453, 5,218,077, 5,367,046, 5,338,826, 5,986,036, and 6,232,428 and Korean Patent Application Publication No. 2003-0009437 disclose a novel structure of polyimide having improved transmittance and color transparency while thermal properties are not significantly reduced using aromatic dianhydride and aromatic diamine monomers having a substituent group such as $-CF_3$ or having a bent structure in which connection to a m-position instead of a p-position occurs due to a connection group such as $-O-$, $-SO_2-$, or $CH_2-$. However, this has been found to be insufficient for use as materials for display devices such as OLEDs, TFT-LCDs, and flexible displays due to limitations in terms of mechanical properties, heat resistance, and birefringence.

DISCLOSURE

Technical Problem

Accordingly, the present invention is intended to provide a polyamide-imide precursor for forming a colorless and transparent film having low birefringence and excellent mechanical properties and heat resistance. In addition, the present invention is intended to provide a polyamide-imide film, manufactured by imidizing the polyamide-imide precursor, and an image display device including the polyamide-imide film.

Technical Solution

Therefore, a preferable first embodiment of the present invention provides a polyamide-imide precursor which includes, in the molecular structure thereof, a first block, obtained by copolymerizing monomers including dianhydride and diamine, a second block, obtained by copolymerizing monomers including an aromatic dicarbonyl compound and the diamine, and a third block, obtained by copolymerizing monomers including the aromatic dicarbonyl compound and aromatic diamine. The dianhydride for forming the first block includes 2-bis(3,4-dicarboxyphenyl) hexafluoropropane dianhydride (6FDA), and the diamine for forming the first block and the second block includes 9,9-bis(3-fluoro-4-aminophenyl)fluorene (FFDA).

Further, a preferable second embodiment of the present invention provides a polyamide-imide resin having a structure which is obtained by imidizing the polyamide-imide precursor of the first embodiment, and a third embodiment provides a polyamide-imide film which is manufactured by imidizing the polyamide-imide precursor of the first embodiment.

Moreover, a preferable fourth embodiment of the present invention provides an image display device including the polyamide-imide film of the third embodiment.

Advantageous Effects

When the polyamide-imide precursor of the present invention is imidized, it is possible to form a colorless and transparent film having low birefringence and excellent mechanical properties and heat resistance. Particularly, the polyamide-imide film of the present invention may be useful for various fields such as a semiconductor insulating film, a TFT-LCD insulating film, a passivation film, a liquid crystal alignment film, an optical communication material, a protective film for a solar cell, and a flexible display substrate.

BEST MODE

Figure 1:
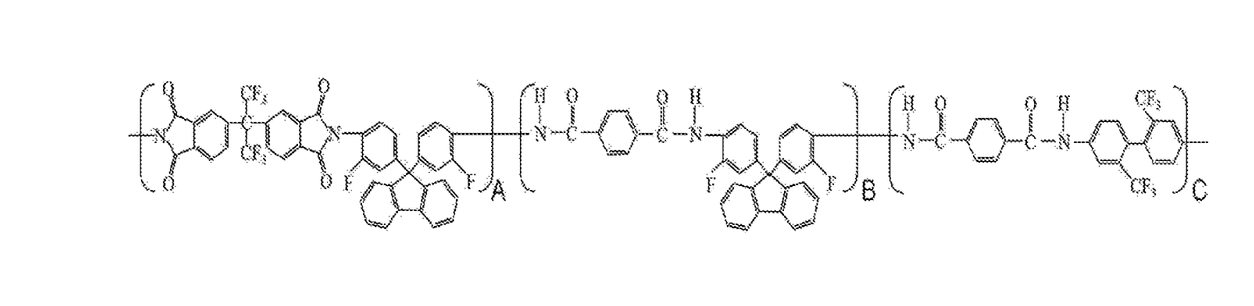
FIG. 1 is a molecular structural formula showing the molecular structure of polyamide-imide, which includes a first block (A) obtained by polymerizing 6FDA and FFDA, a second block (B) obtained by polymerizing TPC and FFDA, and a third block (C) obtained by polymerizing TPC and TFBD, as an example obtained by imidizing a polyamide-imide precursor of the present invention.

The embodiment of the present invention provides a polyamide-imide precursor which includes, in the molecular structure thereof, a first block, obtained by copolymerizing monomers including dianhydride and diamine, a second block, obtained by copolymerizing monomers including an aromatic dicarbonyl compound and the diamine, and a third block, obtained by copolymerizing monomers including the aromatic dicarbonyl compound and aromatic diamine. The dianhydride for forming the first block includes 2-bis(3,4-dicarboxyphenyl)hexafluoropropane dianhydride (6FDA), and the diamine for forming the first block and the second block includes 9,9-bis(3-fluoro-4-aminophenyl)fluorene (FFDA).

To be more specific, the embodiment of the present invention provides a polyamide-imide precursor which includes, in the molecular structure thereof, a first block, obtained by copolymerizing dianhydride including 2-bis(3,4-dicarboxyphenyl)hexafluoropropane dianhydride (6FDA) with diamine including 9,9-bis(3-fluoro-4-aminophenyl)fluorene (FFDA), a second block, obtained by copolymerizing an aromatic dicarbonyl compound with diamine including 9,9-bis(3-fluoro-4-aminophenyl)fluorene (FFDA), and a third block, obtained by copolymerizing the aromatic dicarbonyl compound with aromatic diamine.

When the polyamide-imide precursor of the embodiment of in the present invention is formed into a film for use as a substrate or a protective layer of an image display device, the polyamide-imide precursor is obtained by polymerization which is performed so that all the first block including an imide bond and the second block and the third block including an amide bond are present in the molecular structure thereof, thus ensuring excellent thermal and mechanical properties as well as excellent optical properties. That is, the mechanical properties, which may be poor when the precursor is composed only of the imide structure, may be improved using the second block and the third block, having an amide bond structure, thereby ultimately improving thermal stability, mechanical properties, low birefringence, and optical characteristics in a balanced manner.

Particularly, in the embodiment of the present invention, 6FDA may be used as the dianhydride for forming the first block, thus improving birefringence and ensuring heat resistance. 9,9-bis(3-fluoro-4-aminophenyl)fluorene (FFDA) including a benzene ring, having a bulk bond structure in the molecular structure thereof, may be used as the diamine for forming the first block and the second block, thus effectively preventing a reduction in optical properties caused by the aromatic dicarbonyl compound provided to the second block and the third block.

In the embodiment of the present invention, the total content of the first block and the second block may be preferably 20 to 80 mol % based on a total of 100 moles of all block copolymers in order to improve the yellow index and the birefringence, and may be more preferably 40 to 60 mol % in order to prevent the mechanical properties from deteriorating. When the total content of the first block and the second block is less than 20 mol %, since the molar ratio of the third block is relatively increased, the mechanical properties may be improved, but the heat resistance may be reduced, and optical properties, such as transmittance and yellow index, may be rapidly reduced. When the total content of the first block and the second block is more than 80 mol %, since the improvement in mechanical properties is insignificant, twisting and tearing phenomena may occur during a process for manufacturing displays.

Further, in the embodiment of the present invention, the molar ratio of the first block and the second block is preferably 2:8 to 8:2. When the content of the first block deviates from the above-described range, the thermal stability and the mechanical properties may be improved, but optical properties such as a yellow index or transmittance may be reduced and birefringence may be increased, which makes the precursor difficult to apply to optical devices. On the other hand, when the content of the second block deviates from the above-described range, the effect of improving the thermal stability and the mechanical properties may fall short of expectations.

In the embodiment of the present invention, the aromatic dicarbonyl compound for forming the second block and the third block may be one or more selected from the group consisting of terephthaloyl chloride (p-terephthaloyl chloride, TPC), terephthalic acid, iso-phthaloyl dichloride, and 4,4'-benzoyl dichloride (4,4'-benzoyl chloride) and, more preferably, may be one or more selected from among terephthaloyl chloride (p-terephthaloyl chloride, TPC) and iso-phthaloyl dichloride.

Further, the aromatic diamine for forming the third block may be diamine having one or more flexible groups selected from the group consisting of 2,2-bis(4-(4-aminophenoxy)phenyl)hexafluoropropane (HFBAPP), bis(4-(4-aminophenoxy)phenyl)sulfone (BAPS), bis(4-(3-aminophenoxy)phenyl)sulfone (BAPSM), 4,4'-diaminodiphenylsulfone (ODDS), 3,3'-diaminodiphenylsulfone (3DDS), 2,2-bis(4-(4-aminophenoxy)phenylpropane) (6HMDA), 4,4'-diaminodiphenylpropane (6HDA), 4,4'-diaminodiphenylmethane (MDA), 4,4'-diaminodiphenyl sulfide (4,4'-thiodianiline), 4,4'-diaminodiphenyldiethylsilane, 4,4'-diaminodiphenylsilane (44DDS), 4,4'-diaminodiphenyl N-methylamine, 4,4'-diaminodiphenyl N-phenylamine, 1,3-diaminobenzene (m-PDA), 1,2-diaminobenzene (o-PDA), 4,4'-oxydianiline (44'ODA), 3,3'-oxydianiline (33'ODA), 2,4-oxydianiline (24'ODA), 3,4'-oxydianiline (34'ODA), 1,3-bis(4-aminophenoxy)benzene (TPE-R), 1,3-bis(3-aminophenoxy)benzene (APB), 4,4'-bis(3-aminophenoxy)biphenyl (M-tolidine), and 4,4'-bis(4-aminophenoxy)biphenyl (BAPB).

In the embodiment of the present invention, the aromatic diamine for forming the third block may be different from 9,9-bis(3-fluoro-4-aminophenyl)fluorene (FFDA), which is the diamine for forming the first block and the second block. When FFDA is included in the third block, the structure thereof may be identical to that of the second block, so that desirable mechanical properties resulting from the three-component structure may not be ensured. Likewise, when the aromatic diamine for forming the third block is replaced by FFDA in the first and second blocks, the structures of the second and third blocks may become the same, which leads to a decrease in optical properties and an increase in birefringence. That is, preferably, FFDA, which is a cardo-based diamine including a benzene ring of a bulk structure, is included in the first and second blocks. It is preferable to use the aromatic diamine in the third block in order to ensure desired mechanical properties.

In addition, when a structure derived from the aromatic dicarbonyl compound is included in the molecular structure, it may be easy to realize high thermal stability and mechanical properties, but birefringence may be high due to a benzene ring in the molecular structure. Accordingly, in the embodiment of the present invention, more preferably, the aromatic diamine for forming the third block may have a molecular structure including a flexible group, from the viewpoint of preventing a reduction in birefringence caused by the aromatic dicarbonyl compound. Particularly, the aromatic diamine may preferably have a long flexible group and a substituent group present at a meta position, and may be preferably one or more aromatic diamines selected from among bis(4-(3-aminophenoxy)phenyl)sulfone (BAPSM), 4,4'-diaminodiphenylsulfone (ODDS), and 2,2-bis(4-(4-aminophenoxy)phenyl)hexafluoropropane (HFBAPP), in order to realize excellent birefringence.

In the embodiment of the present invention, the polyamide-imide precursor includes, in the molecular structure thereof, the first block, obtained by copolymerizing the dianhydride including 2-bis(3,4-dicarboxyphenyl)hexafluoropropane dianhydride (6FDA) with the diamine including 9,9-bis(3-fluoro-4-aminophenyl)fluorene (FFDA), the second block, obtained by copolymerizing the aromatic dicarbonyl compound with the diamine including 9,9-bis(3-fluoro-4-aminophenyl)fluorene (FFDA), and the third block, obtained by copolymerizing the aromatic dicarbonyl compound and the aromatic diamine, using polymerization of the monomers. The polyamide-imide precursor preferably has a weight average molecular weight of 60,000 to 70,000, measured using GPC (gel permeation chromatography), and a viscosity of 400 to 600 ps, within a solid concentration range of about 20 to 25 wt %.

Meanwhile, the embodiment of the present invention may provide a polyamide-imide resin having a structure obtained by ring-closing dehydration, that is, imidization, of the polyamide-imide precursor, or may provide a polyamide-imide film manufactured by imidizing the polyamide-imide precursor. In order to manufacture the polyamide-imide resin or the polyamide-imide film using the polyamide-imide precursor, the following imidization step may be carried out.

First, a polyamide-imide precursor solution is manufactured by copolymerizing «dianhydride and aromatic dicarbonyl compound» and «diamine and aromatic diamine» satisfying the above-described conditions of the present invention at an equivalent ratio of 1:1 based on the total molar ratio of the monomers. The polymerization reaction conditions are not particularly limited, but the polymerization reaction may be preferably performed in an inert atmosphere such as nitrogen or argon at −10 to 80° C. for 2 to 48 hours.

A solvent may be used for the solution polymerization reaction of the monomers. The solvent is not particularly limited, as long as it is a known reaction solvent, but one or more polar solvents selected from among m-cresol, N-methyl-2-pyrrolidone (NMP), dimethylformamide (DMF), dimethylacetamide (DMAc), dimethyl sulfoxide (DMSO), acetone, and ethyl acetate may be preferably used. In addition, a low-boiling-point solution such as tetrahydrofuran (THF) and chloroform, or a low-absorbency solvent, such as γ-butyrolactone, may be used.

Further, the content of the solvent is not particularly limited. However, in order to obtain the appropriate molecular weight and viscosity of the polyamide-imide precursor solution, the content of the solvent may be preferably 50 to 95 wt %, and more preferably 70 to 90 wt %, based on the total content of the polyamide-imide precursor solution.

Subsequently, a known imidization method may be appropriately selected to imidize the obtained polyamide-imide precursor solution. For example, a thermal imidization method or a chemical imidization method may be applied, or a thermal imidization method and a chemical imidization method may be applied in combination.

In the chemical imidization method, a dehydrating agent, which is represented by an acid anhydride such as acetic anhydride, and an imidization catalyst, which is represented by tertiary amines such as isoquinoline, (3-picoline, and pyridine, are added to the polyimide-imide precursor solution to perform a reaction. In the thermal imidization method, the polyamide-imide precursor solution is slowly heated at a temperature range of 40 to 300° C. for 1 to 8 hours to perform a reaction.

In the embodiment of the present invention, a complex imidization method in which the thermal imidization method and the chemical imidization method are used in combination may be applied as an example of a method of manufacturing the polyamide-imide film. To be more specific, the complex imidization method may be performed through a series of processes. In the processes, the dehydrating agent and the imidization catalyst are added to the polyamide-imide precursor solution to be cast on a support, and are then heated to 80 to 200° C., and preferably 100 to 180° C., to be activated. The resulting substance is partially cured and dried, followed by heating at 200 to 400° C. for 5 to 400 seconds.

Further, in the embodiment of the present invention, the obtained polyamide-imide precursor solution may be imidized, and the imidized solution may be added to a second solvent, followed by precipitation, filtration, and drying to thus obtain a polyamide-imide resin solid. The obtained polyamide-imide resin solid may be dissolved in a first solvent for film formation, thereby manufacturing a polyamide-imide film. As for the drying conditions after the polyamide-imide resin solid is filtered, preferably, the temperature is 50 to 120° C. and the time is 3 to 24 hours in consideration of the boiling point of the second solvent. Casting may be performed and the temperature may be slowly increased at a temperature range of 40 to 400° C. for 1 minute to 8 hours, thereby achieving the film formation process.

Further, the first solvent may be the same as the solvent used during the polymerization of the polyamide-imide precursor solution. As the second solvent, a solvent having a polarity lower than that of the first solvent, that is, one or more selected from among water, alcohols, ethers, and ketones, may be used in order to obtain the polyamide-imide resin solid. The content of the second solvent is not particularly limited, but is preferably 5 to 20 times by weight based on the weight of the polyamide-imide precursor solution.

In the embodiment of the present invention, the obtained polyamide-imide film may be additionally heat-treated once more in order to eliminate the thermal history and the residual stress remaining in the film. The temperature of the additional heat treatment process is preferably 300 to 500° C. and the heat treatment time is preferably 1 minute to 3 hours. The residual volatile content of the heat-treated film may be 5% or less, and preferably 3% or less. As a result, the heat-treated film ultimately exhibits very stable thermal properties.

In the embodiment of the present invention, the thickness of the polyamide-imide film is not particularly limited, but is preferably in the range of 5 to 100 μm, and more preferably 9 to 15 μm.

The polyamide-imide film according to the embodiment of in the present invention exhibits optical properties including a birefringence (n) of 0.030 or less, and preferably 0.019 or less which is defined using TE (transverse electric)-TM (transverse magnetic) based on a film thickness of 10 to 50 μm, a transmittance of 88% or more, preferably 90% or more, and more preferably 90.68 or more which is measured at 550 nm, and a yellow index of 5 or less, thus being useful for an optical device such as a substrate or a protective layer of a display.

Further, in the polyimide film according to the present invention, a coefficient of linear thermal expansion (CTE), which is repeatedly measured twice at 50 to 250° C. using a thermomechanical analysis method (TMA method) based on a film thickness of 10 to 50 µm, is 60 ppm/° C. or less, preferably 44.50 ppm/° C. or less, more preferably 40.37 ppm/° C. or less and more preferably 37.12 ppm/° C. or less and an elongation at break measured based on ASTM D882 is 5% or more, preferably 5.31% or more and more preferably 6.11% or more. Accordingly, bending or deformation does not easily occur even under severe process temperatures or sudden temperature change during the manufacture of displays, thus exhibiting excellent yield.

Further, since the above-mentioned polyimide film is included in the present invention, it is possible to provide an image display device having excellent optical and physical properties and high manufacturing yield.

MODE FOR INVENTION

A better understanding of the present invention may be obtained through the following Examples which are set forth to illustrate, but are not to be construed to limit the present invention.

EXAMPLE 1

In a 500 ml reactor which was equipped with a stirrer, a nitrogen injector, a dropping funnel, a temperature controller, and a condenser, 398.628 g of N-methyl-2-pyrrolidone (NMP) was charged while passing nitrogen therethrough, and 49.207 g (0.128 mol) of 9,9-bis(3-fluoro-4-aminophenyl)fluorene (FFDA) was dissolved. Subsequently, 10.247 g (0.032 mol) of 2-bis(3,4-dicarboxyphenyl)hexafluoropropane dianhydride (6FDA) was added and reacted for 2 hours, and 10.247 g (0.032 mol) of bistrifluoromethylbenzidine (TFDB) was added. After the temperature of the solution was maintained at 10° C. or less, 25.987 g (0.128 mol) of terephthaloyl chloride (TPC) was added and reacted at a low temperature for 1 hour, and the temperature was increased to normal temperature, followed by reaction for 18 hours, thus obtaining a polyamide-imide precursor solution having a solid concentration of 20 wt % and a viscosity of 120 poise.

After the completion of the reaction, the obtained solution was applied on a stainless steel plate, cast to 10 to 20 µm, dried in hot air at 80° C. for 20 minutes, at 120° C. for 20 minutes, and at a constant temperature of 300° C. for 10 minutes, slowly cooled, and separated from the plate, thus manufacturing a polyamide-imide film having a thickness of 20 µm.

EXAMPLE 2

In a 500 ml reactor which was equipped with a stirrer, a nitrogen injector, a dropping funnel, a temperature controller, and a condenser, 386.301 g of N-methyl-2-pyrrolidone (NMP) was charged while passing nitrogen therethrough, and 30.754 g (0.08 mol) of FFDA was dissolved. Subsequently, 14.216 g (0.032 mol) of 6FDA was added and reacted for 2 hours, and 25.618 g (0.08 mol) of TFDB was added. After the temperature of the solution was maintained at 10° C. or less, 25.987 g (0.128 mol) of TPC was added and reacted at a low temperature for 1 hour, and the temperature was increased to normal temperature, followed by reaction for 18 hours, thus obtaining a polyamide-imide precursor solution having a solid concentration of 20 wt % and a viscosity of 640 poise.

Subsequently, a polyamide-imide film was manufactured according to the same procedure as in Example 1.

EXAMPLE 3

In a 500 ml reactor which was equipped with a stirrer, a nitrogen injector, a dropping funnel, a temperature controller, and a condenser, 401.714 g of N-methyl-2-pyrrolidone (NMP) was charged while passing nitrogen therethrough, and 19.606 g (0.051 mol) of FFDA was dissolved. Subsequently, 15.105 g (0.034 mol) of 6FDA was added and reacted for 2 hours, and 38.107 g (0.119 mol) of TFDB was added. After the temperature of the solution was maintained at 10° C. or less, 27.611 g (0.136 mol) of TPC was added and reacted at a low temperature for 1 hour, and the temperature was increased to normal temperature, followed by reaction for 18 hours, thus obtaining a polyamide-imide precursor solution having a solid concentration of 20 wt % and a viscosity of 1100 poise.

Subsequently, a polyamide-imide film was manufactured according to the same procedure as in Example 1.

EXAMPLE 4

In a 500 ml reactor which was equipped with a stirrer, a nitrogen injector, a dropping funnel, a temperature controller, and a condenser, 390.410 g of N-methyl-2-pyrrolidone (NMP) was charged while passing nitrogen therethrough, and 36.905 g (0.096 mol) of FFDA was dissolved. Subsequently, 14.216 g (0.032 mol) of 6FDA was added and reacted for 2 hours, and 20.495 g (0.064 mol) of TFDB was added. After the temperature of the solution was maintained at 10° C. or less, 25.987 g (0.128 mol) of TPC was added and reacted at a low temperature for 1 hour, and the temperature was increased to normal temperature, followed by reaction for 18 hours, thus obtaining a polyamide-imide precursor solution having a solid concentration of 20 wt % and a viscosity of 610 poise.

Subsequently, a polyamide-imide film was manufactured according to the same procedure as in Example 1.

EXAMPLE 5

In a 500 ml reactor which was equipped with a stirrer, a nitrogen injector, a dropping funnel, a temperature controller, and a condenser, 405.849 g of N-methyl-2-pyrrolidone (NMP) was charged while passing nitrogen therethrough, and 36.905 g (0.096 mol) of FFDA was dissolved. Subsequently, 21.324 g (0.048 mol) of 6FDA was added and reacted for 2 hours, and 20.495 g (0.064 mol) of TFDB was added. After the temperature of the solution was maintained at 10° C. or less, 22.738 g (0.112 mol) of TPC was added and reacted at a low temperature for 1 hour, and the temperature was increased to normal temperature, followed by reaction for 18 hours, thus obtaining a polyamide-imide precursor solution having a solid concentration of 20 wt % and a viscosity of 590 poise.

Subsequently, a polyamide-imide film was manufactured according to the same procedure as in Example 1.

EXAMPLE 6

In a 500 ml reactor which was equipped with a stirrer, a nitrogen injector, a dropping funnel, a temperature controller, and a condenser, 394.957 g of N-methyl-2-pyrrolidone (NMP) was charged while passing nitrogen therethrough, and 34.599 g (0.09 mol) of FFDA was dissolved. Subsequently, 26.655 g (0.06 mol) of 6FDA was added and reacted for 2 hours, and 12.914 g (0.06 mol) of TFDB was added. After the temperature of the solution was maintained at 10° C. or less, 18.272 g (0.09 mol) of TPC was added and reacted at a low temperature for 1 hour, and the temperature was increased to normal temperature, followed by reaction for 18 hours, thus obtaining a polyamide-imide precursor solution having a solid concentration of 20 wt % and a viscosity of 550 poise.

Subsequently, a polyamide-imide film was manufactured according to the same procedure as in Example 1.

EXAMPLE 7

In a 500 ml reactor which was equipped with a stirrer, a nitrogen injector, a dropping funnel, a temperature controller, and a condenser, 398.288 g of N-methyl-2-pyrrolidone (NMP) was charged while passing nitrogen therethrough, and 31.139 g (0.081 mol) of FFDA was dissolved. Subsequently, 23.99 g (0.054 mol) of 6FDA was added and reacted for 2 hours, and 27.999 g (0.054 mol) of 2,2-bis(4-(4-aminophenoxy)phenyl)hexafluoropropane (HFBAPP) was added. After the temperature of the solution was maintained at 10° C. or less, 16.445 g (0.081 mol) of TPC was added and reacted at a low temperature for 1 hour, and the temperature was increased to normal temperature, followed by reaction for 18 hours, thus obtaining a polyamide-imide precursor solution having a solid concentration of 20 wt % and a viscosity of 420 poise.

Subsequently, a polyamide-imide film was manufactured according to the same procedure as in Example 1.

COMPARATIVE EXAMPLE 1

In a 500 ml reactor which was equipped with a stirrer, a nitrogen injector, a dropping funnel, a temperature controller, and a condenser, 338.101 g of N-methyl-2-pyrrolidone (NMP) was charged while passing nitrogen therethrough, and 39.212 g (0.102 mol) of FFDA was dissolved. After the temperature of the solution was maintained at normal temperature, 45.314 g (0.102 mol) of 6FDA was added and reacted for 18 hours, thus obtaining a polyamide-imide precursor solution having a solid concentration of 20 wt % and a viscosity of 120 poise.

Subsequently, a polyamide-imide film was manufactured according to the same procedure as in Example 1.

COMPARATIVE EXAMPLE 2

In a 500 ml reactor which was equipped with a stirrer, a nitrogen injector, a dropping funnel, a temperature controller, and a condenser, 399.466 g of N-methyl-2-pyrrolidone (NMP) was charged while passing nitrogen therethrough, and 65.353 g (0.17 mol) of FFDA was dissolved. After the temperature of the solution was maintained at 10° C. or less, 34.513 g (0.17 mol) of TPC was added and reacted at a low temperature for 1 hour, and the temperature was increased to normal temperature, followed by reaction for 18 hours, thus obtaining a polyamide-imide precursor solution having a solid concentration of 20 wt % and a viscosity of 150 poise.

Subsequently, a polyamide-imide film was manufactured according to the same procedure as in Example 1.

COMPARATIVE EXAMPLE 3

In a 500 ml reactor which was equipped with a stirrer, a nitrogen injector, a dropping funnel, a temperature controller, and a condenser, 397.530 g of N-methyl-2-pyrrolidone (NMP) was charged while passing nitrogen therethrough, and 41.630 g (0.13 mol) of TFDB was dissolved. After the temperature of the solution was maintained at normal temperature, 57.753 g (0.13 mol) of 6FDA was added and reacted for 18 hours, thus obtaining a polyamide-imide precursor solution having a solid concentration of 20 wt % and a viscosity of 1750 poise.

Subsequently, a polyamide-imide film was manufactured according to the same procedure as in Example 1.

COMPARATIVE EXAMPLE 4

In a 500 ml reactor which was equipped with a stirrer, a nitrogen injector, a dropping funnel, a temperature controller, and a condenser, 397.670 g of N-methyl-2-pyrrolidone (NMP) was charged while passing nitrogen therethrough, and 60.844 g (0.19 mol) of TFDB was dissolved. After the temperature of the solution was maintained at 10° C. or less, 38.574 g (0.19 mol) of TPC was added and reacted at a low temperature for 1 hour, and the temperature was increased to normal temperature, followed by reaction for 18 hours, thus obtaining a polyamide-imide precursor solution having a solid concentration of 20 wt % and a viscosity of 2100 poise.

Subsequently, a polyamide-imide film was manufactured according to the same procedure as in Example 1.

COMPARATIVE EXAMPLE 5

In a 500 ml reactor which was equipped with a stirrer, a nitrogen injector, a dropping funnel, a temperature controller, and a condenser, 388.660 g of N-methyl-2-pyrrolidone (NMP) was charged while passing nitrogen therethrough, and 9.611 g (0.025 mol) of FFDA was dissolved. After the temperature of the solution was maintained at normal temperature, 32.023 g (0.1 mol) of TFDB was added and, after 2 hours, 55.531 g (0.125 mol) of 6FDA was added. The reaction was performed for 18 hours, thus obtaining a polyamide-imide precursor solution having a solid concentration of 20 wt % and a viscosity of 1100 poise.

Subsequently, a polyamide-imide film was manufactured according to the same procedure as in Example 1.

COMPARATIVE EXAMPLE 6

In a 500 ml reactor which was equipped with a stirrer, a nitrogen injector, a dropping funnel, a temperature controller, and a condenser, 398.290 g of N-methyl-2-pyrrolidone (NMP) was charged while passing nitrogen therethrough, and 24.027 g (0.0625 mol) of FFDA was dissolved. After the temperature of the solution was maintained at normal temperature, 20.014 g (0.0625 mol) of TFDB was added, and after 2 hours, 55.531 g (0.125 mol) of 6FDA was added. The reaction was performed for 18 hours, thus obtaining a polyamide-imide precursor solution having a solid concentration of 20 wt % and a viscosity of 550 poise.

Subsequently, a polyamide-imide film was manufactured according to the same procedure as in Example 1.

COMPARATIVE EXAMPLE 7

In a 500 ml reactor which was equipped with a stirrer, a nitrogen injector, a dropping funnel, a temperature controller, and a condenser, 407.920 g of N-methyl-2-pyrrolidone (NMP) was charged while passing nitrogen therethrough, and 38.443 g (0.1 mol) of FFDA was dissolved. After the temperature of the solution was maintained at normal temperature, 8.006 g (0.025 mol) of TFDB was added, and after 2 hours, 55.531 g (0.125 mol) of 6FDA was added. The reaction was performed for 18 hours, thus obtaining a polyamide-imide precursor solution having a solid concentration of 20 wt % and a viscosity of 110 poise.

Subsequently, a polyamide-imide film was manufactured according to the same procedure as in Example 1.

COMPARATIVE EXAMPLE 8

In a 500 ml reactor which was equipped with a stirrer, a nitrogen injector, a dropping funnel, a temperature controller, and a condenser, 438.887 g of N-methyl-2-pyrrolidone (NMP) was charged while passing nitrogen therethrough, and 26.141 g (0.068 mol) of FFDA was dissolved. Subsequently, 30.209 g (0.068 mol) of 6FDA was added and reacted for 2 hours, and 32.663 g (0.102 mol) of TFDB was added. After the temperature of the solution was maintained at 10° C. or less, 20.708 g (0.102 mol) of TPC was added and reacted at a low temperature for 1 hour, and the temperature was increased to normal temperature, followed by reaction for 18 hours, thus obtaining a polyamide-imide precursor solution having a solid concentration of 20 wt % and a viscosity of 920 poise.

Subsequently, a polyamide-imide film was manufactured according to the same procedure as in Example 1.

COMPARATIVE EXAMPLE 9

In a 500 ml reactor which was equipped with a stirrer, a nitrogen injector, a dropping funnel, a temperature controller, and a condenser, 421.425 g of N-methyl-2-pyrrolidone (NMP) was charged while passing nitrogen therethrough, and 54.439 g (0.17 mol) of TFDB was dissolved. Subsequently, 30.209 g (0.068 mol) of 6FDA was added and reacted for 2 hours. After the temperature of the solution was maintained at 10° C. or less, 20.708 g (0.102 mol) of TPC was added and reacted at a low temperature for 1 hour, and the temperature was increased to normal temperature, followed by reaction for 18 hours, thus obtaining a polyamide-imide precursor solution having a solid concentration of 20 wt % and a viscosity of 710 poise.

Subsequently, a polyamide-imide film was manufactured according to the same procedure as in Example 1.

COMPARATIVE EXAMPLE 10

In a 500 ml reactor which was equipped with a stirrer, a nitrogen injector, a dropping funnel, a temperature controller, and a condenser, 465.081 g of N-methyl-2-pyrrolidone (NMP) was charged while passing nitrogen therethrough, and 65.353 g (0.17 mol) of FFDA was dissolved. Subsequently, 30.209 g (0.068 mol) of 6FDA was added and reacted for 2 hours. After the temperature of the solution was maintained at 10° C. or less, 20.708 g (0.102 mol) of TPC was added and reacted at a low temperature for 1 hour, and the temperature was increased to normal temperature, followed by reaction for 18 hours, thus obtaining a polyamide-imide precursor solution having a solid concentration of 20 wt % and a viscosity of 220 poise.

Subsequently, a polyamide-imide film was manufactured according to the same procedure as in Example 1.

COMPARATIVE EXAMPLE 11

In a 500 ml reactor which was equipped with a stirrer, a nitrogen injector, a dropping funnel, a temperature controller, and a condenser, 417.187 g of N-methyl-2-pyrrolidone (NMP) was charged while passing nitrogen therethrough, and 29.217 g (0.076 mol) of FFDA was dissolved. 36.506 g (0.114 mol) of TFDB was dissolved while the temperature was maintained. After the temperature of the solution was maintained at 10° C. or less, 38.574 g (0.190 mol) of TPC was added and reacted at a low temperature for 1 hour, and the temperature was increased to normal temperature, followed by the reaction for 18 hours, thus obtaining a polyamide-imide precursor solution having a solid concentration of 20 wt % and a viscosity of 530 poise.

Subsequently, a polyamide-imide film was manufactured according to the same procedure as in Example 1.

COMPARATIVE EXAMPLE 12

In a 500 ml reactor which was equipped with a stirrer, a nitrogen injector, a dropping funnel, a temperature controller, and a condenser, 420.722 g of N-methyl-2-pyrrolidone (NMP) was charged while passing nitrogen therethrough, and 46.113 g (0.144 mol) of TFDB was dissolved. Subsequently, 15.993 g (0.036 mol) of 6FDA was added and reacted for 2 hours, and 13.839 g (0.036 mol) of FFDA was added. After the temperature of the solution was maintained at 10° C. or less, 29.235 g (0.144 mol) of TPC was added and reacted at a low temperature for 1 hour, and the temperature was increased to normal temperature, followed by reaction for 18 hours, thus obtaining a polyamide-imide precursor solution having a solid concentration of 20 wt % and a viscosity of 325 poise.

Subsequently, a polyamide-imide film was manufactured according to the same procedure as in Example 1.

COMPARATIVE EXAMPLE 13

In a 500 ml reactor which was equipped with a stirrer, a nitrogen injector, a dropping funnel, a temperature controller, and a condenser, 450.566 g of N-methyl-2-pyrrolidone (NMP) was charged while passing nitrogen therethrough, and 58.433 g (0.152 mol) of FFDA was dissolved. Subsequently, 11.180 g (0.038 mol) of BPDA was added and reacted for 6 hours, and 12.169 g (0.038 mol) of TFDB was added. After the temperature of the solution was maintained at 10° C. or less, 30.859 g (0.152 mol) of TPC was added and reacted at a low temperature for 1 hour, and the temperature was increased to normal temperature, followed by reaction for 18 hours, thus obtaining a polyamide-imide precursor solution having a solid concentration of 20 wt % and a viscosity of 280 poise.

Subsequently, a polyamide-imide film was manufactured according to the same procedure as in Example 1.

<Measurement>

The physical properties of the polyamide-imide films manufactured in the Examples and the Comparative Examples were evaluated using the following methods. The results are described in Tables 1 and 2 below.

(1) Viscosity: The viscosity was measured twice using Scandal 6 or 7 of a Brookfield viscometer (RVDV-II+P) at 25 rpm and 50 rpm to obtain the average value.

(2) Measurement of transmittance: The transmittance was measured three times at 550 nm using a UV spectrophotometer (Konica Minolta, CM-3700d), and the average value is shown in Table 1.

(3) Measurement of yellow index (Y.I.): The yellow index was measured according to an ASTM E313 standard using a UV spectrophotometer (Konica Minolta, CM-3700d).

(4) Measurement of birefringence: The birefringence was measured at 532 nm using a birefringence analyzer (Prism Coupler, Sairon SPA4000) three times in each of TE (transverse electric) and TM (transverse magnetic) modes to obtain the average value, and (TE mode)-(TM mode) was taken as the birefringence value.

(5) Measurement of coefficient of thermal expansion (CTE): The coefficient of linear thermal expansion was measured twice at 50 to 250° C. using TMA (TA Instrument Company, Q400) according to a TMA method. The size of the sample was 4 mm×24 mm, the load was 0.02 N, and the rate of temperature increase was 10° C./min. Residual stress may remain in the film due to heat treatment after the film formation. With respect thereto, after the residual stress was completely removed in a first run, a second value was presented as the actually measured value.

(6) Measurement of elongation at break (%): The elongation at break was measured according to a ASTM-D882 standard using a 5967 from Instron Company. The size of the sample was 15 mm×100 mm, the load cell was 1 KN, and the tensile rate was 10 mm/min when measured.

TABLE 1

| No. | Component[1] | Molar ratio | A/B/C[2] | Viscosity (poise) | 550 nm transmittance (%) | Y.I. |
|---|---|---|---|---|---|---|
| Example 1 | (FFDA:TFDB):(6FDA:TPC) | (8:2):(2:8) | 0.2/0.6/0.2 | 120 | 90.00 | 1.65 |
| Example 2 | (FFDA:TFDB):(6FDA:TPC) | (5:5):(2:8) | 0.2/0.3/0.5 | 640 | 90.70 | 1.35 |
| Example 3 | (FFDA:TFDB):(6FDA:TPC) | (3:7):(2:8) | 0.2/0.1/0.7 | 1100 | 88.70 | 3.46 |
| Example 4 | (FFDA:TFDB):(6FDA:TPC) | (6:4):(2:8) | 0.2/0.4/0.4 | 610 | 90.65 | 1.41 |
| Example 5 | (FFDA:TFDB):(6FDA:TPC) | (6:4):(3:7) | 0.3/0.3/0.4 | 590 | 90.72 | 1.52 |
| Example 6 | (FFDA:TFDB):(6FDA:TPC) | (6:4):(4:6) | 0.4/0.2/0.4 | 550 | 90.68 | 1.48 |
| Example 7 | (FFDA:HFBAPP):(6FDA:TPC) | (6:4):(4:6) | 0.4/0.2/0.4 | 420 | 90.20 | 1.62 |
| Comparative Example 1 | FFDA:6FDA | 10:10 | 1/0/0 | 120 | 89.79 | 1.09 |
| Comparative Example 2 | FFDA:TPC | 10:10 | 0/1/0 | 150 | 88.65 | 0.98 |
| Comparative Example 3 | TFDB:6FDA | 10:10 | 1/0/0 | 1750 | 90.34 | 1.37 |
| Comparative Example 4 | TFDB:TPC | 10:10 | 0/0/1 | 2100 | 76.87 | 23.9 |
| Comparative Example 5 | (FFDA:TFDB):6FDA | (2:8):10 | 1/0/0 | 1100 | 90.97 | 1.09 |
| Comparative Example 6 | (FFDA:TFDB):6FDA | (5:5):10 | 1/0/0 | 550 | 90.75 | 0.73 |
| Comparative Example 7 | (FFDA:TFDB):6FDA | (8:2):10 | 1/0/0 | 110 | 90.24 | 0.74 |
| Comparative Example 8 | (FFDA:TFDB):(6FDA:TPC) | (4:6):(4:6) | 0.4/0/0.6 | 920 | 88.53 | 3.52 |
| Comparative Example 9 | TFDB:6FDA:TPC | 10:4:6 | 0.4/0/0.6 | 710 | 89.21 | 3.07 |
| Comparative Example 10 | FFDA:6FDA:TPC | 10:4:6 | 0.4/0.6/0 | 220 | 90.11 | 1.78 |
| Comparative Example 11 | FFDA:TFDB:TPC | 4:6:10 | 0/0.4/0.6 | 530 | 88.72 | 3.34 |
| Comparative Example 12 | (TFDB:FFDA):(6FDA:TPC) | (8:2):(2:8) | 0.2/0.6/0.2 | 325 | 90.17 | 2.03 |
| Comparative Example 13 | (FFDA:TFDB):(BPDA:TPC) | (8:2):(2:8) | 0.2/0.6/0.2 | 280 | 87.11 | 5.17 |

[1]When the monomers are the same, the order of description of the monomers is the order of addition thereof.
[2]A = first block, B = second block, C = third block

TABLE 2

| No. | Prism coupler | | Birefringence | Coefficient of linear thermal expansion (ppm/° C.) | Elongation at break (%) |
|---|---|---|---|---|---|
| | TE (transverse electric) mode | TM (transverse magnetic) mode | | | |
| Example 1 | 1.6609 | 1.6436 | 0.0173 | 50.91 | 3.92% |
| Example 2 | 1.6494 | 1.6304 | 0.0190 | 34.40 | 5.31% |
| Example 3 | 1.6551 | 1.6223 | 0.0328 | 36.68 | 5.02% |
| Example 4 | 1.6482 | 1.6300 | 0.0182 | 37.12 | 5.11% |
| Example 5 | 1.6517 | 1.6364 | 0.0153 | 39.99 | 4.98% |
| Example 6 | 1.6544 | 1.6395 | 0.0149 | 40.37 | 5.03% |
| Example 7 | 1.6714 | 1.6583 | 0.0121 | 44.50 | 6.11% |
| Comparative Example 1 | 1.6090 | 1.6014 | 0.0076 | 62.22 | 3.40% |
| Comparative Example 2 | 1.6958 | 1.6811 | 0.0147 | 47.25 | 4.01% |
| Comparative Example 3 | 1.5604 | 1.5520 | 0.0084 | 54.04 | 3.84% |

TABLE 2-continued

| | Prism coupler | | | | |
|---|---|---|---|---|---|
| No. | TE (transverse electric) mode | TM (transverse magnetic) mode | Birefringence | Coefficient of linear thermal expansion (ppm/° C.) | Elongation at break (%) |
| Comparative Example 4 | 1.6621 | 1.5461 | 0.1160 | 28.81 | 6.29% |
| Comparative Example 5 | 1.5757 | 1.5593 | 0.0164 | 63.28 | 3.38% |
| Comparative Example 6 | 1.5769 | 1.5663 | 0.0106 | 63.76 | 2.61% |
| Comparative Example 7 | 1.6086 | 1.5998 | 0.0088 | 66.70 | 2.58% |
| Comparative Example 8 | 1.6581 | 1.6109 | 0.0472 | 31.21 | 5.41% |
| Comparative Example 9 | 1.6614 | 1.6189 | 0.0425 | 34.37 | 4.99% |
| Comparative Example 10 | 1.6522 | 1.6430 | 0.0092 | 61.78 | 3.22% |
| Comparative Example 11 | 1.6417 | 1.5999 | 0.0418 | 33.42 | 4.52% |
| Comparative Example 12 | 1.6618 | 1.6490 | 0.0128 | 59.43 | 3.28% |
| Comparative Example 13 | 1.5432 | 1.5195 | 0.0237 | 42.17 | 4.78% |

From Tables 1 and 2, it could be confirmed that in Examples 1 to 7, the transmittance, the yellow index, and the birefringence were similar to those of Comparative Examples 1, 3, and 5 to 7, which were typical polyimide substrates, and that the coefficient of thermal expansion was low. Accordingly, the optical properties and the heat resistance were excellent, and the elongation at break was the same as or higher than that of Comparative Examples 2 and 4, which were polyamide, showing that Examples 1 to 7 had excellent mechanical properties. Particularly, it could be confirmed that the birefringence and the elongation at break were further improved when HFBAPP, which was the diamine having a long flexible group, was added, as in Example 7.

Further, when the second block, obtained by copolymerizing FFDA and the aromatic dicarbonyl compound, was not included in the molecular structure, as in Comparative Examples 8 and 9, there was a limitation in the optical properties (a reduction in transmittance and an increase in a birefringence difference value). When the first block or the second block was not formed, as in Comparative Examples 10 and 11, the heat resistance (Comparative Example 10) or the birefringence (Comparative Example 11) was reduced, depending on the type of block that was not formed. Further, when FFDA was not included as the diamine for forming the first block and the second block, the heat resistance was poor, as in Comparative Example 12. When 6FDA was not included as the dianhydride for forming the first block, the value of the yellow index was found to be undesirable, as in Comparative Example 13.

INDUSTRIAL APPLICABILITY

The present invention relates to a polyamide-imide precursor, and is applicable to polyamide-imide obtained by imidizing the same, a polyamide-imide film, and an image display device including the film.

The invention claimed is:

1. A polyamide-imide precursor comprising:
in a molecular structure thereof,
a first block obtained by copolymerizing monomers including a dianhydride and a diamine;
a second block obtained by copolymerizing monomers including an aromatic dicarbonyl compound and the diamine; and
a third block obtained by copolymerizing monomers including the aromatic dicarbonyl compound and an aromatic diamine,
wherein the dianhydride for forming the first block is 2-bis(3,4-dicarboxyphenyl)hexafluoropropane dianhydride (6FDA), and the diamine for forming the first block and the second block is 9,9-bis(3-fluoro-4-aminophenyl)fluorene (FFDA),
wherein the aromatic diamine for forming the third block is different from 9,9-bis(3-fluoro-4-aminophenyl)fluorene (FFDA),
wherein a total amount of the diamine for forming the first block and the second block is larger than an amount of the dianhydride for forming the first block, and
wherein a sum of the amount of the dianhydride for forming the first block and an amount of the aromatic dicarbonyl compound for forming the second block and the third block is larger than the amount of the diamine for forming the first block and the second block,
wherein a total content of the first block and the second block is 30 to 80 mol % based on a total of 100 moles of all block copolymers,
wherein a molar ratio of the first block and the second block is 8:2 to 2:8, and
wherein the first block is formed before the second block.

2. The polyamide-imide precursor of claim 1, wherein the aromatic dicarbonyl compound for forming the second block and the third block is one or more selected from the group consisting of terephthaloyl chloride (p-terephthaloyl chloride, TPC), terephthalic acid, iso-phthaloyl dichloride, and 4,4'-benzoyl dichloride (4,4'-benzoyl chloride).

3. The polyamide-imide precursor of claim 1, wherein the aromatic diamine for forming the third block is one or more selected from the group consisting of 2,2-bis(4-(4-aminophenoxy)phenyl)hexafluoropropane (HFBAPP), bis(4-(4-aminophenoxy)phenyl)sulfone (BAPS), bis(4-(3-aminophenoxy)phenyl)sulfone (BAPSM), 4,4'-diaminodiphenylsulfone (4DDS), 3,3'-diaminodiphenylsulfone (3DDS), 2,2-bis(4-(4-aminophenoxy)phenylpropane) (6HMDA), 4,4'-diaminodiphenylpropane (6HDA), 4,4'-diaminodiphenylmethane (MDA), 4,4'-diaminodiphenyl sulfide (4,4'-thiodianiline), 4,4'-diaminodiphenyldiethylsilane, 4,4'-diaminodiphenylsilane (44DDS), 4,4'-diaminodiphenyl N-methyl amine, 4,4'-diaminodiphenyl N-phenylamine, 1,3-diaminobenzene (m-PDA), 1,2-diaminobenzene (o-PDA), 4,4'-oxydianiline (44'ODA), 3,3'-oxydianiline (33'ODA), 2,4-oxydianiline (24'ODA), 3,4'-oxydianiline (34'ODA), 1,3-bis(4-aminophenoxy)benzene (TPE-R), 1,3-bis(3-aminophenoxy)benzene (APB), 4,4'-bis(3-aminophenoxy)biphenyl (M-tolidine), bistrifluoromethylbenzidine (TFDB), and 4,4'-bis(4-aminophenoxy)biphenyl (BAPB).

4. A polyamide-imide resin having a structure which is obtained by imidizing the polyamide-imide precursor of claim 1.

5. A polyamide-imide film which is manufactured by imidizing the polyamide-imide precursor of claim 1.

6. The polyamide-imide film of claim 5, wherein the polyamide-imide film has a birefringence (n) of 0.030 or less, which is defined as follows: TE (transverse electric)-TM (transverse magnetic).

7. The polyamide-imide film of claim 5, wherein the polyamide-imide film has a coefficient of linear thermal expansion (CTE) of 60 ppm/° C. or less, which is repeatedly measured twice at 50 to 250° C. using a thermomechanical analysis method (TMA method) based on a film thickness of 10 to 50 μm.

8. The polyamide-imide film of claim 5, wherein the polyamide-imide film has a transmittance of 88% or more, which is measured at 550 nm based on a film thickness of 10 to 50 μm, and has a yellow index of 5 or less.

9. The polyamide-imide film of claim 5, wherein the polyamide-imide film has an elongation at break of 5% or more, which is measured based on ASTM D882 (a film thickness of 10 to 50 μm).

10. An image display device comprising:
the polyamide-imide film of claim 5.

11. A polyamide-imide resin having a structure which is obtained by imidizing the polyamide-imide precursor of claim 2.

12. A polyamide-imide film which is manufactured by imidizing the polyamide-imide precursor of claim 2.

13. A polyamide-imide resin having a structure which is obtained by imidizing the polyamide-imide precursor of claim 3.

14. A polyamide-imide film which is manufactured by imidizing the polyamide-imide precursor of claim 3.

* * * * *